(12) United States Patent
Nishino

(10) Patent No.: US 9,456,096 B2
(45) Date of Patent: Sep. 27, 2016

(54) RECORDING MEDIUM

(71) Applicant: KYOCERA Document Solutions Inc., Osaka (JP)

(72) Inventor: Tetsuya Nishino, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/807,620

(22) Filed: Jul. 23, 2015

(65) Prior Publication Data

US 2016/0028906 A1 Jan. 28, 2016

(30) Foreign Application Priority Data

Jul. 25, 2014 (JP) ................................. 2014-152408

(51) Int. Cl.
*H04N 1/00* (2006.01)
(52) U.S. Cl.
CPC ...... *H04N 1/00511* (2013.01); *H04N 1/00204* (2013.01); *H04N 1/00244* (2013.01); *H04N 1/00344* (2013.01); *H04N 1/00408* (2013.01); *H04N 1/00503* (2013.01); *H04N 1/00938* (2013.01); *H04N 1/00973* (2013.01)
(58) Field of Classification Search
CPC ................................................. H04N 1/00511
USPC ........................................................ 358/1.15
See application file for complete search history.

(56) References Cited

U.S. PATENT DOCUMENTS

| 7,953,702 B2 | 5/2011 | Tomita | |
|---|---|---|---|
| 2006/0050297 A1* | 3/2006 | Morikawa | H04N 1/32122 358/1.15 |
| 2006/0212497 A1 | 9/2006 | Tomita | |
| 2006/0285160 A1* | 12/2006 | Tomita | H04N 1/324 358/1.16 |
| 2008/0055661 A1* | 3/2008 | Yoshida | H04N 1/00912 358/403 |

(Continued)

FOREIGN PATENT DOCUMENTS

| JP | 2006-260464 A | 9/2006 |
|---|---|---|
| JP | 2006-295466 A | 10/2006 |
| JP | 2007-293654 A | 11/2007 |
| JP | 2011-077655 A | 4/2011 |

(Continued)

OTHER PUBLICATIONS

An Office Action; "Notice of Reasons for Rejection," issued by the Japanese Patent Office on Apr. 28, 2016, which corresponds to Japanese Patent Application No. 2014-152408 and is related to U.S. Appl. No. 14/807,620.

*Primary Examiner* — Jacky X Zheng
(74) *Attorney, Agent, or Firm* — Studebaker & Brackett PC

(57) ABSTRACT

When installing a driver program on a terminal device of a user who joins a group to which an image forming apparatus supported by the driver program is assigned, a non-transitory recording medium for installation of the driver program causes a computer in the terminal device to display an operation screen including a first and a second operation element. When the first operation element is selected, the computer is caused to create a document box for the user and add membership information of the user to group management data managed by a predetermined server. When the second operation element is selected, the computer is caused to create the document box, identify an image forming apparatus assigned to a former group of the user with reference to the group management data, delete a document box from the identified image forming apparatus, and add the membership information to the group management data.

3 Claims, 9 Drawing Sheets

(56) References Cited

U.S. PATENT DOCUMENTS

2013/0176584 A1    7/2013   Takashima
2014/0149563 A1    5/2014   Ono

FOREIGN PATENT DOCUMENTS

| JP | 2013-101595 A | 5/2013 |
|----|---------------|--------|
| JP | 2014-106610 A | 6/2014 |

* cited by examiner

RECORDING MEDIUM

INCORPORATION BY REFERENCE

The present application claims priority under 35 U.S.C. §119 to Japanese Patent Application No. 2014-152408 filed Jul. 25, 2014. The contents of this application are incorporated herein by reference in their entirety.

BACKGROUND

The present disclosure relates to a recording medium and an image forming apparatus.

In an organization such as a company, image forming apparatuses such as multifunction peripherals may be assigned to different groups, such as departments and divisions within the organization, and each user uses a specific image forming apparatus assigned to the group to which the user belongs.

Some image forming apparatuses have a function of allocating its resource, such as user document boxes, to individual users. When a user is transferred from one group to another, an administrator is usually required to make the resource settings (for example, create a document box for the user) in an image forming apparatus assigned to the new group. The administrator is also required to make settings on the image forming apparatus assigned to the group to which the user formerly belongs so as to deallocate the resource (delete the document box created for the user).

SUMMARY

A non-transitory computer-readable recording medium according to one aspect of the present disclosure stores therein an installer program that is for execution by a computer in a terminal device to install a driver program on the terminal device when a user of the terminal device joins a target group to which an image forming apparatus of a specific model supported by the driver program is assigned. The installer program causes the computer to display an operation screen on a display device of the terminal device, the operation screen including a first operation element to be selected when the user joins the target group without having previously belonged to any other groups and a second operation element to be selected when the user joins the target group as a result of transfer from a former group to which the user formerly belonged. In response to selection of the first operation element by the user, the installer program causes the computer to: control the image forming apparatus to create therein a document box for the user; and add membership information of the user to group management data managed by a predetermined server. In response to selection of the second operation element by the user, the installer program causes the computer to: control the image forming apparatus to create therein a document box for the user; identify an image forming apparatus assigned to the former group with reference to the group management data; control the identified image forming apparatus to delete a document box created therein for the user; and add membership information of the user to the group management data. The membership information includes identification information of the user and identification information of the image forming apparatus assigned to the target group. The group management data includes, for each of a plurality of users, history data including identification information of image forming apparatuses assigned to groups to which the corresponding user has belonged, the history data being based on membership information having been added to the group management information for the corresponding user.

A non-transitory computer-readable recording medium according to another aspect of the present disclosure stores therein a driver program that is to be installed on a terminal device when a user of the terminal device joins a target group to which an image forming apparatus of a specific model supported by the driver program is assigned. The driver program stored in the non-transitory computer-readable recording medium causes the computer to: display an operation screen on a display device of the terminal device upon first activation of the terminal device by the user after installation of the driver program, the operation screen including a first operation element to be selected when the user joins the target group without having previously belonged to any other groups and a second operation element to be selected when the user joins the target group as a result of transfer from a former group to which the user formerly belonged. In response to selection of the first operation element by the user, the driver program causes the computer to: control the image forming apparatus to create therein a document box for the user; and add membership information of the user to group management data managed by a predetermined server. In response to selection of the second operation element by the user, the driver program causes the computer to: control the image forming apparatus to create therein a document box for the user; identify an image forming apparatus assigned to the former group with reference to the group management data; control the identified image forming apparatus to delete a document box created therein for the user; and add membership information of the user to the group management data. The membership information includes identification information of the user and identification information of the image forming apparatus assigned to the target group. The group management data includes, for each of a plurality of users, history data including identification information of image forming apparatuses assigned to groups to which the corresponding user has belonged, the history data being based on membership information having been added to the group management information for the corresponding user.

An image forming apparatus according to a yet another aspect of the present disclosure is assigned to a target group joined by a user. The image forming apparatus includes a display device; a document box management section configured to perform document box creation and document box deletion; and a log-in processing section configured to process log-in of the user to the image forming apparatus. The log-in processing section displays an operation screen on the display device when no log-in history indicating that the user has logged in to the image forming apparatus is found, the operation screen including a first operation element to be selected when the user joins the target group without having previously belonged to any other groups and a second operation element to be selected when the user joins the target group as a result of transfer from a former group to which the user formerly belonged. In response to selection of the first operation element by the user, the log-in processing section: controls the document box management section to create a document box for the user; and adds membership information of the user to group management data managed by a predetermined server. In response to selection of the second operation element by the user, the log-in processing section: controls the document box management section to create therein a document box for the user; identifies an image forming apparatus assigned to the former group with reference to the group management data;

controls the identified image forming apparatus to delete a document box created therein for the user; and adds membership information of the user to the group management data. The membership information includes identification information of the user and identification information of the image forming apparatus. The group management data includes, for each of a plurality of users, history data including identification information of image forming apparatuses assigned to groups to which the corresponding user has belonged, the history data being based on membership information having been added to the group management information for the corresponding user.

DETAILED DESCRIPTION

Figure 1:
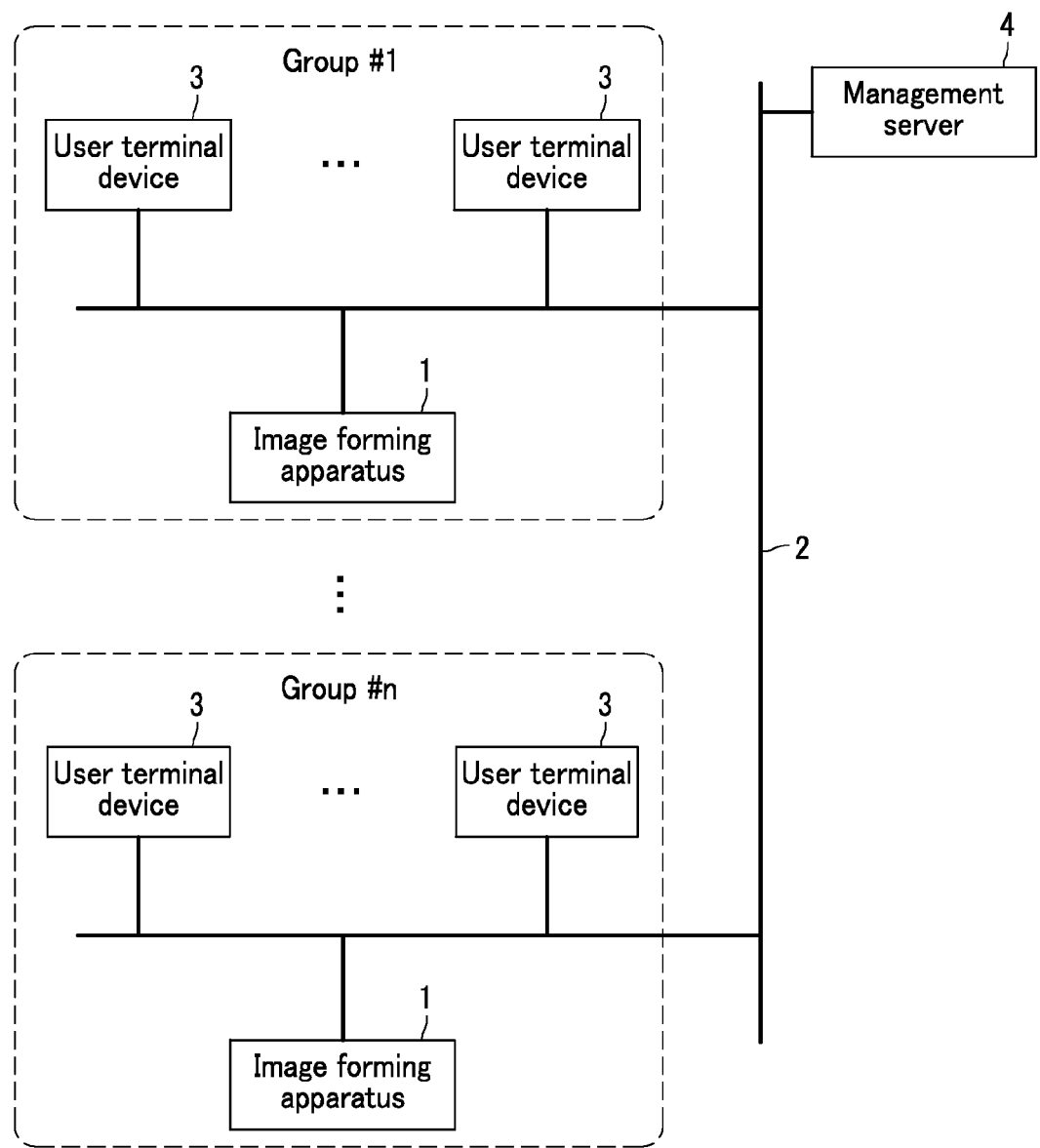
FIG. 1 is a block diagram showing one example of the configuration of an image forming system.

The following describes embodiments of the present disclosure with reference to the drawings.
First Embodiment FIG. 1 is a block diagram showing one example of the configuration of an image forming system. In the system shown in FIG. 1, a plurality of image forming apparatuses 1 assigned to different groups #1 to #n are connected to a network 2. One or more user terminal devices 3 are also connected to the network 2. A management server 4 is also connected to the network 2.

The image forming apparatus 1 is a multifunction peripheral or may alternatively be a different device having a printing function, such as a printer or a copier. Each image forming apparatus 1 is assigned to a specific group #i and used by the member users belonging to the specific group #i. Use of the image forming apparatus 1 by member users of other groups is not typically permitted. The network 2 is for example a local area network (LAN) within the company.

The user terminal devices 3 are for example personal computers installed with a driver program supporting a specific model of image forming apparatuses 1. More specifically, each user terminal device 3 belonging to a specific group #i is installed with a driver program supporting the specific model corresponding to the image forming apparatus 1 assigned to the group #i, by designating identification information of the image forming apparatus 1. Consequently, the user terminal device 3 of the group #i can control the image forming apparatus 1 assigned to the group #i.

The management server 4 handles data management (including maintenance, addition, deletion, and edition) of user data of the individual users, machine data of the individual image forming apparatuses 1, and group management data. The user data includes attribute information of each user, such as the user ID, password, and user name. The machine data includes information of each image forming apparatus 1, such as the machine ID (identification information), the group name (or group ID) to which the image forming apparatus 1 is assigned, and the installation location. The group management data includes information of the individual groups and their member users. The group management data is used for group-by-group processing or function management on the image forming apparatuses 1. When a user newly joins a group or is transferred to the group, the group management data is updated by adding the machine ID of the image forming apparatus 1 assigned to the group into the machine ID history relating to the user.

The following describes the structure of the image forming apparatuses 1, the user terminal devices 3, and the management server 4.

Figure 2:
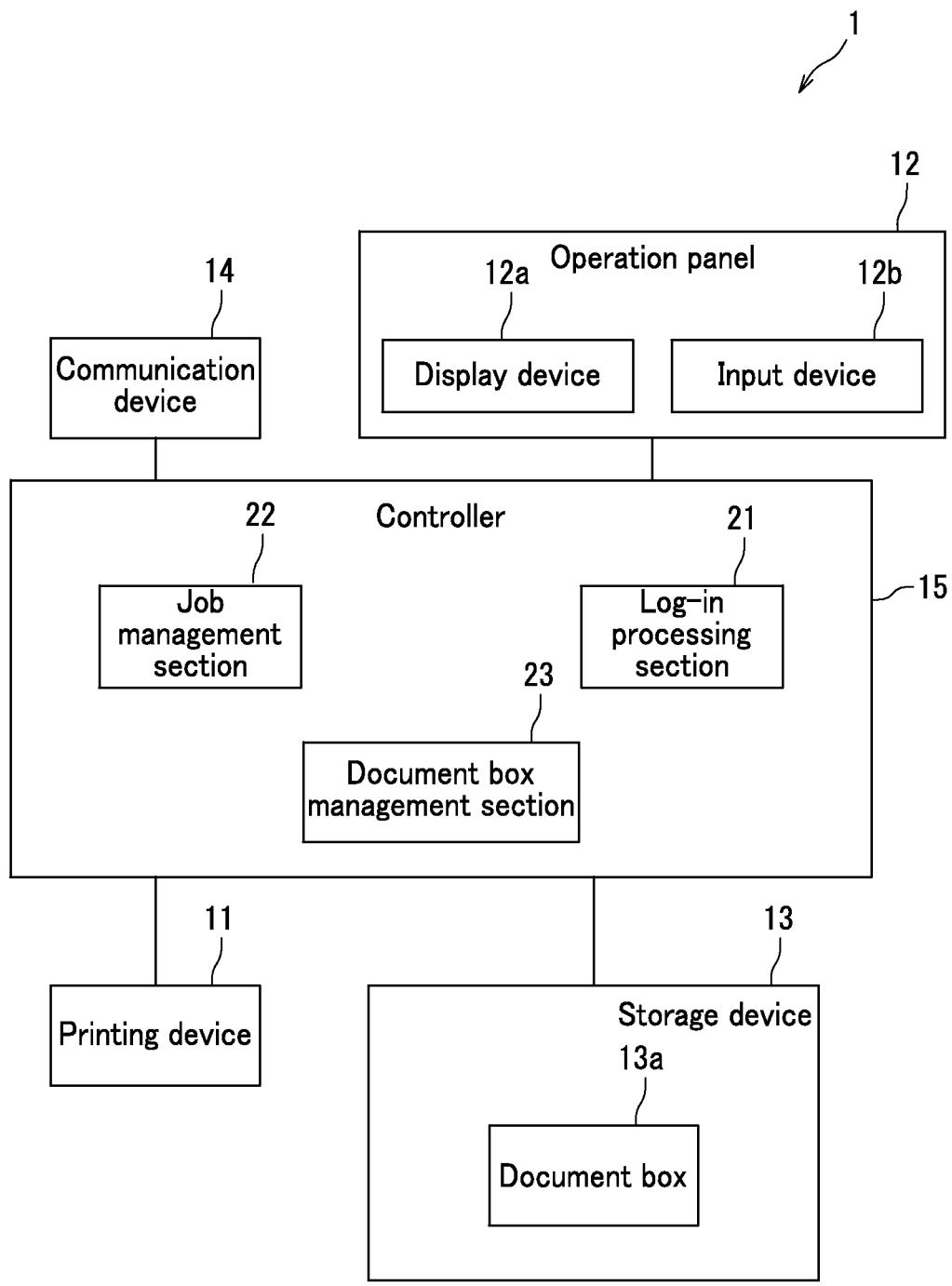
FIG. 2 is a block diagram showing the structure of an image forming apparatus shown in FIG. 1.

FIG. 2 is a block diagram showing the structure of an image forming apparatus 1 shown in FIG. 1. As shown in FIG. 2, each image forming apparatus 1 includes a printing device 11, an operation panel 12, a storage device 13, a communication device 14, and a controller 15.

The printing device 11 is an internal device for electrographic printing of image data page by page on printing paper.

The operation panel 12 is located on the housing surface of the image forming apparatus 1. The operation panel 12 includes a display device 12a and an input device 12b. The display device 12a displays various types of information to users. The input device 12b detects a user operation made thereon. The display device 12a may for example be a liquid crystal display. The input device 12b may for example be key switches or a touch panel.

The storage device 13 can store various data and programs. The storage device 13 may be a non-volatile memory or a large-capacity non-volatile storage medium such as a hard disk drive. In the storage device 13, document boxes 13a are allocated to different users. Each document box 13a is used by a corresponding user to store document data and other data. Each document box 13a is associated with the document box settings, including the setting to share the document box 13a with other users, the setting to limit the maximum permitted storage capacity, and the setting to limit the retention period of stored data.

The communication device 14 is connected to the network 2. The communication device 14 is circuitry for data communications with other devices (for example, the user terminal devices 3 and the management server 4) connected to the network 2.

The controller 15 includes a central processing unit (CPU), read only memory (ROM), and random access memory (RAM). The controller 15 loads one or more programs to the RAM from the ROM, the storage device 13, and so on. Through execution of the programs by the CPU, the controller 15 implements the relevant processing units. In this embodiment, the controller 15 implements a log-in processing section 21, a job management section 22, and a document box management section 23.

On detecting a log-in operation by a user, the log-in processing section 21 acquires user identification information (user ID alone or a user ID and a password) input by the user on the operation panel 12. The log-in processing section 21 then performs authentication of the user based on the acquired user identification information. On successfully authenticating the user, the log-in processing section 21 permits the log-in. If the user authentication fails, the log-in processing section 21 refuses the log-in. The user authentication may be carried out by using the management server 4 as an authentication server.

When the log-in is permitted, the operation panel 12 displays an operation screen on which the functions of the image forming apparatus 1 are selectable. When the log-in is not permitted, the log-in screen promoting for the user identification information continues to be displayed.

The user identification information may be acquired by the operation panel 12 based on text input by the user. Alternatively, the user identification information may be acquired by using a non-illustrated ID card reader connected to the controller 15 to read an ID card of the user.

The job management section 22 receives a job request received from a user terminal device 3 via the communication device 14 or a job request input on the operation panel 12 by the user. The job management section 22 executes a job (printing or copying) as per the job request.

The document box management section 23 performs creation, deletion, and edition of a document box 13a as well as addition and deletion of document data to or from the document box 13a.

Figure 3:
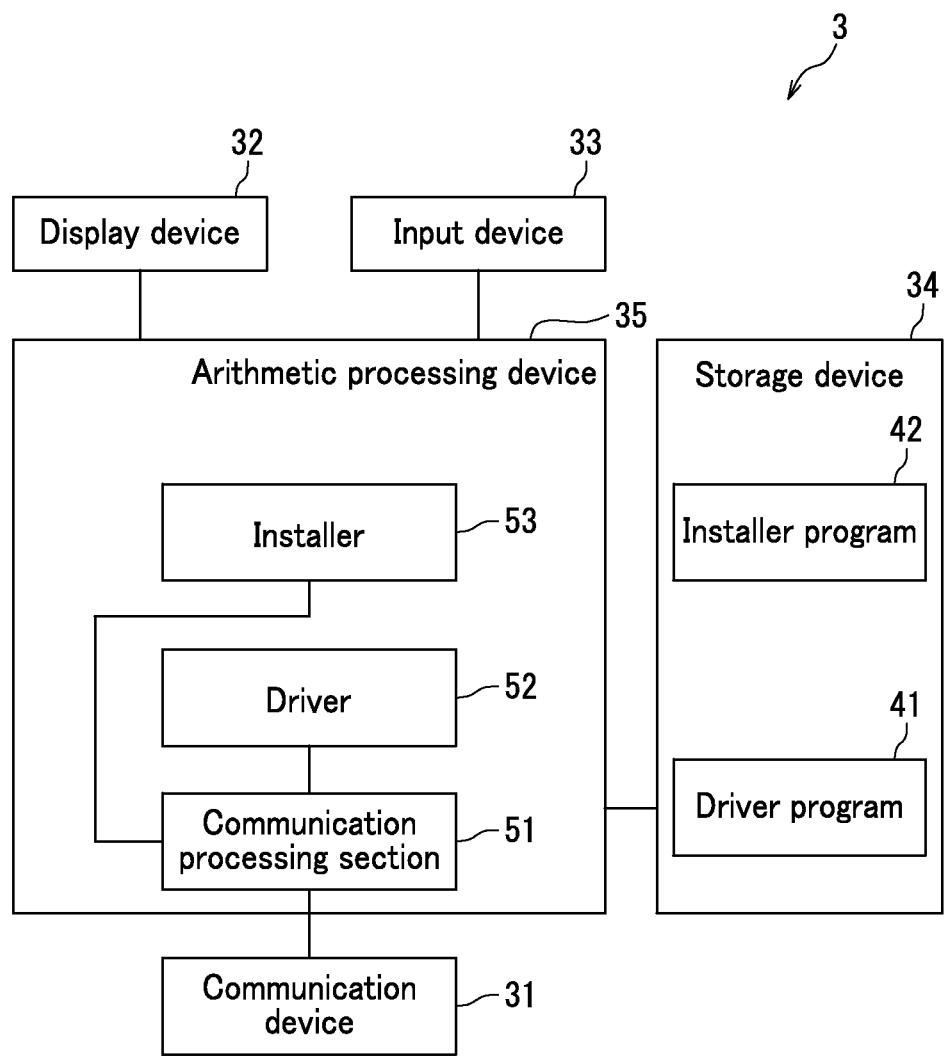
FIG. 3 is a block diagram showing the structure of a user terminal device shown in FIG. 1.

FIG. 3 is a block diagram showing the structure of a user terminal device 3 shown in FIG. 1. The user terminal device 3 is for example a personal computer having a network communication function and installed with an operating system, an application program, and so on. Each user terminal device 3 includes a communication device 31, a display device 32, an input device 33, a storage device 34 (recording medium), and an arithmetic processing device 35.

The communication device 31 is connected to the network 2. The communication device 31 performs data communication with other devices (for example, an image forming apparatus 1) via the network 2, using a predetermined protocol. The communication device 31 may be a network interface or a modem. The display device 32 displays various display screens to the user of the user terminal device 3. The display device 32 may for example be a device such as a liquid crystal display. The input device 33 detects an operation made by a user. The input device 33 may for example be a keyboard or a mouse.

The storage device 34 can store various data and programs. The storage device 34 may be a non-volatile memory or a large-capacity non-volatile storage medium such as a hard disk drive.

The storage device 34 stores an installer program 42 for installation of a driver program 41. The installer program 42 may be downloaded from a predetermined server or read from a portable recording medium such as a CD-ROM. Alternatively, the driver program 41 may be included in the installer program 42 and decompressed into the storage device 34 at the time of insulation of the driver program 41. When the driver program 41 is not included in the installer program 42, the driver program 41 is downloaded and stored into the storage device 34 from a predetermined server at the time of installation of the driver program 41 according to the installer program 42.

The arithmetic processing device 35 is a computer having a CPU, ROM, RAM, and so on. The arithmetic processing device 35 loads one or more programs to the RAM from the storage device 34, the ROM, and so on. Through execution of the programs by the CPU, the arithmetic processing device 35 implements the relevant processing units.

Upon startup of the user terminal device 3, the arithmetic processing device 35 appropriately executes the programs. In this embodiment, the arithmetic processing device 35 implements various processing units, including a non-illustrated operating system, a communication processing section 51, and a driver 52.

The communication processing section 51 controls the communication device 31 to perform data communications using a predetermined communication protocol.

The driver 52 supports the image forming apparatus 1 assigned to the group to which the user terminal device 3 belongs. The driver 52 is a processing unit implemented by the arithmetic processing device 35 through execution of the driver program 41 stored in the storage device 34. The driver 52 generates print data such as page description language (PDL) data from document data that is generated using an application program.

An installer 53 is a processing unit implemented by the arithmetic processing device 35 through execution of the installer program 42 stored in the storage device 34. The installer 53 installs the driver program 41 into the user terminal device 3.

Figure 4:
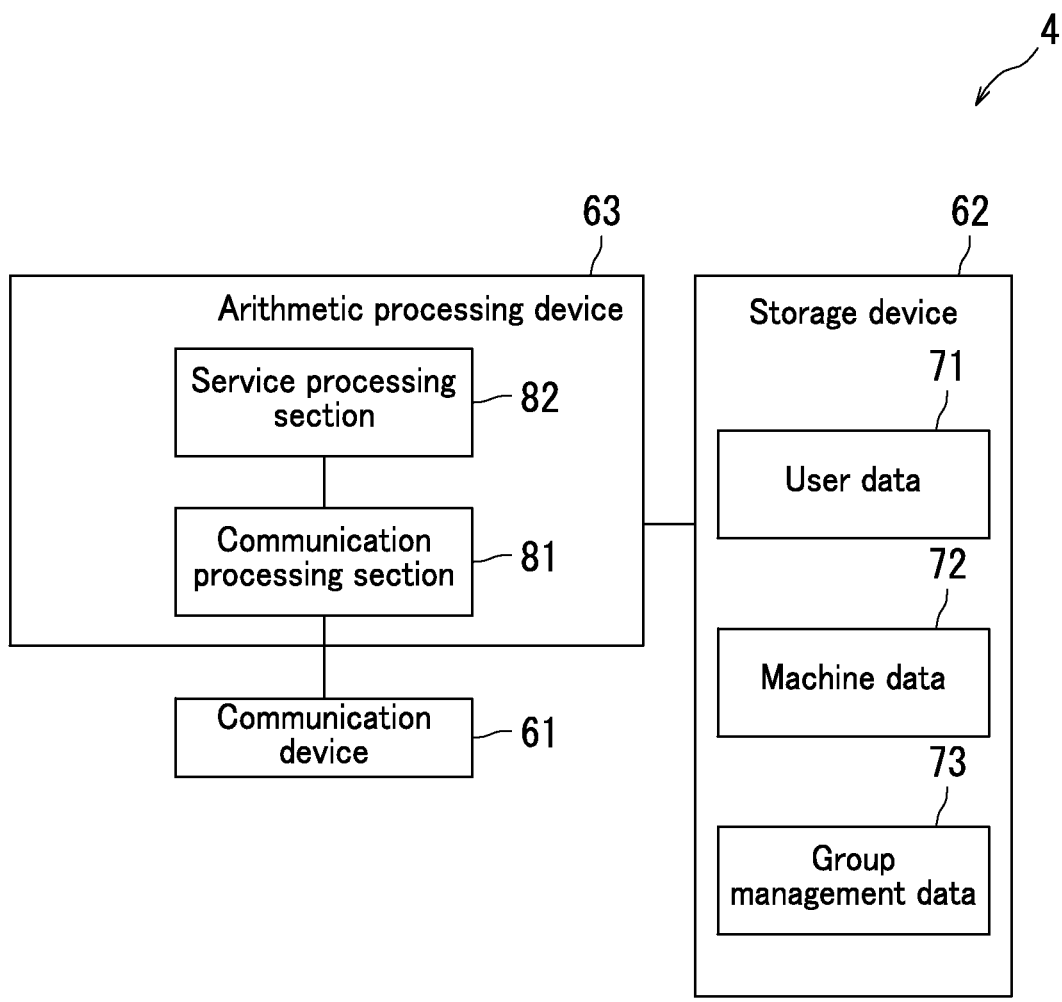
FIG. 4 is a block diagram showing the structure of a management server shown in FIG. 1.

FIG. 4 is a block diagram showing the structure of the management server 4 shown in FIG. 1. The management server 4 is for example a server computer having a network communication function and installed with an operating system, a server program, and so on.

The management server 4 includes a communication device 61, a storage device 62, and an arithmetic processing device 63.

The communication device 61 is connected to the network 2. The communication device 61 performs data communication with other devices (for example, the image forming apparatuses 1) via the network 2, using a predetermined protocol. The communication device 61 may be a network interface or a modem.

The storage device 62 can store various data and programs. The storage device 62 may be a non-volatile memory or a large-capacity non-volatile storage medium such as a hard disk drive. The storage device 62 stores user data 71, machine data 72, and group management data 73.

The user data 71 includes user identification information and user attribute information of each registered user.

Figure 5:
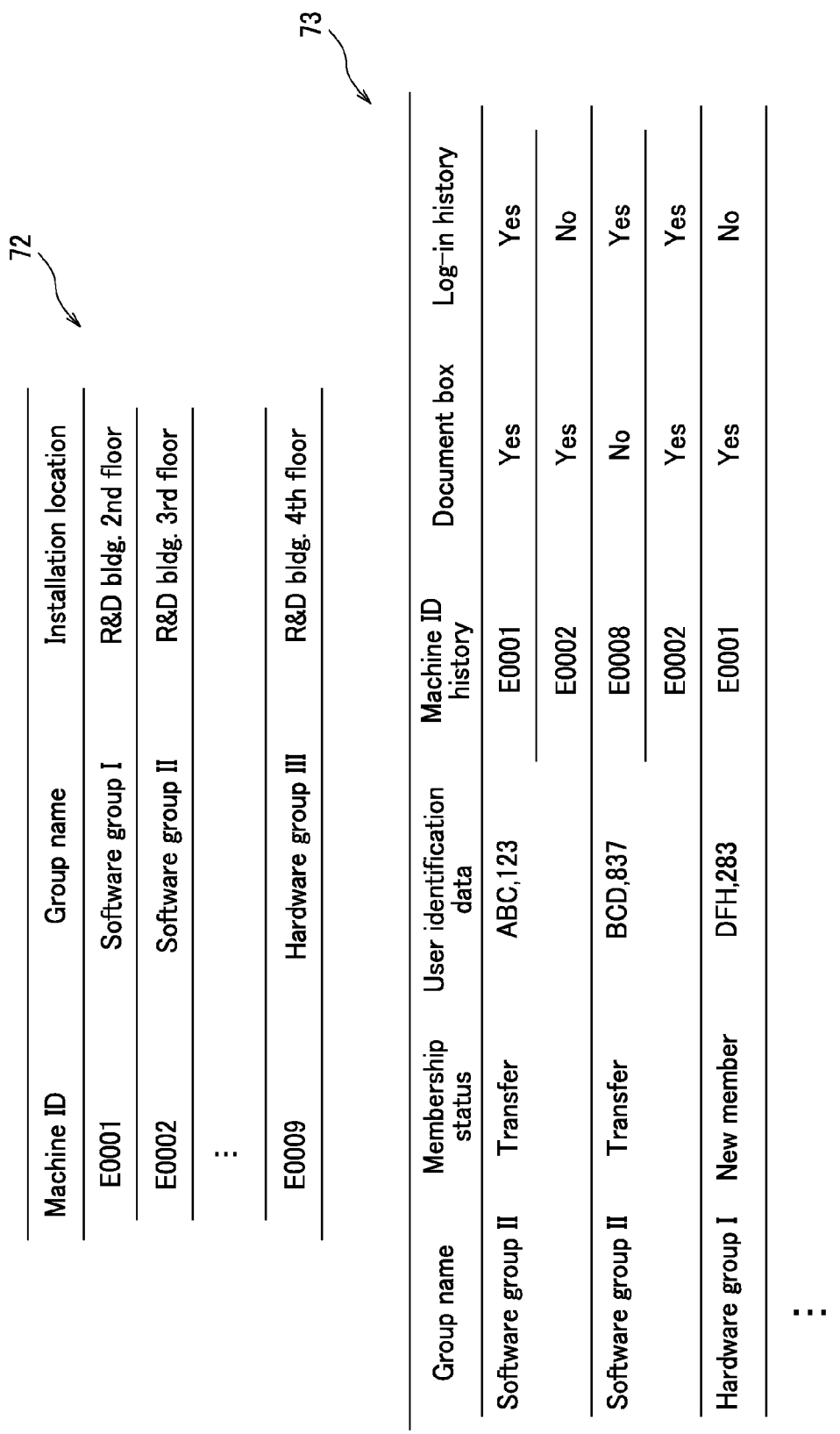
FIG. 5 shows one example of machine data and group management data shown in FIG. 4.

FIG. 5 shows one example of the machine data 72 and the group management data 73 shown in FIG. 4.

The machine data 72 includes, for each of the image forming apparatuses 1 assigned to the groups #1 to #n, a machine ID that is identification information of the image forming apparatus 1, a group name, and an installation location.

The group management data 73 includes, for each user, a name of the group to which the user currently belongs (joins), a current membership status of the user, user identification data (user ID and password), machine ID history, document box information, and a log-in history. The document box information indicates, for each machine ID included in the machine ID history, whether or not the image forming apparatus 1 identified by the machine ID has a document box 13a created for the corresponding user. The log-in history indicates a record of log-in by the corresponding user to each of the image forming apparatuses identified by the machine IDs included in the machine ID history (whether or not the user has logged in to each image forming apparatus at least once).

The group management data 73 shown in FIG. 5 indicates for example that the user having the user ID "ABC" currently belongs to (joins) the software group II, is assigned the image forming apparatus 1 having the machine ID "E0002", and was assigned the image forming apparatus 1 having the machine ID "E0001" while the user belonged to the former group before transfer to the software group II.

The group management data 73 is manually editable by the administrator with, for example, editor software. Additionally, as will be described later, the group management data 73 is automatically updated in response to a request from the image forming apparatuses 1 or the user terminal devices 3.

Reference is made back to FIG. 4. The arithmetic processing device 63 is a computer having a CPU, ROM, RAM, and so on. The arithmetic processing device 63 loads one or more programs to RAM from the storage device 62, the ROM, and so on. Through execution of the programs by the CPU, the arithmetic processing device 63 implements the relevant processing units.

Upon startup of the management server 4, the arithmetic processing device 63 appropriately executes the programs. In this embodiment, the arithmetic processing device 63 implements various processing units, including a non-illustrated operating system, a communication processing section 81, and a service processing section 82.

The communication processing section 81 controls the communication device 61 to perform data communications using a predetermined communication protocol.

The service processing section 82 updates the group management data 73 in response to a request from the image forming apparatuses 1 or the user terminal devices 3.

In the above-described system according to the first embodiment, the installer program 42 corresponds to the installer program of the present disclosure, and installs the driver program 41 that supports image forming apparatuses of a specific model. In other words, the installer program 42 to be selected and used is for installing onto a user terminal device 3 the driver program 41 supporting the image forming apparatus 1 assigned to the group #i to which the user terminal device 3 belongs.

For installation of the driver program 41 when a user of a user terminal device 3 joins a group (hereinafter, target group) to which the image forming apparatus 1 is assigned, the installer 53 performs the following.

During the installation, the installer 53 displays an operation screen including a first operation element and a second operation element on the display device 32 of the user terminal device 3. The first operation element is to be selected when the user joins the target group without having previously belonged to any other groups. The second operation element is to be selected when the user joins the target group as a result of transfer from a former group to which the user formerly belonged.

Figure 6:
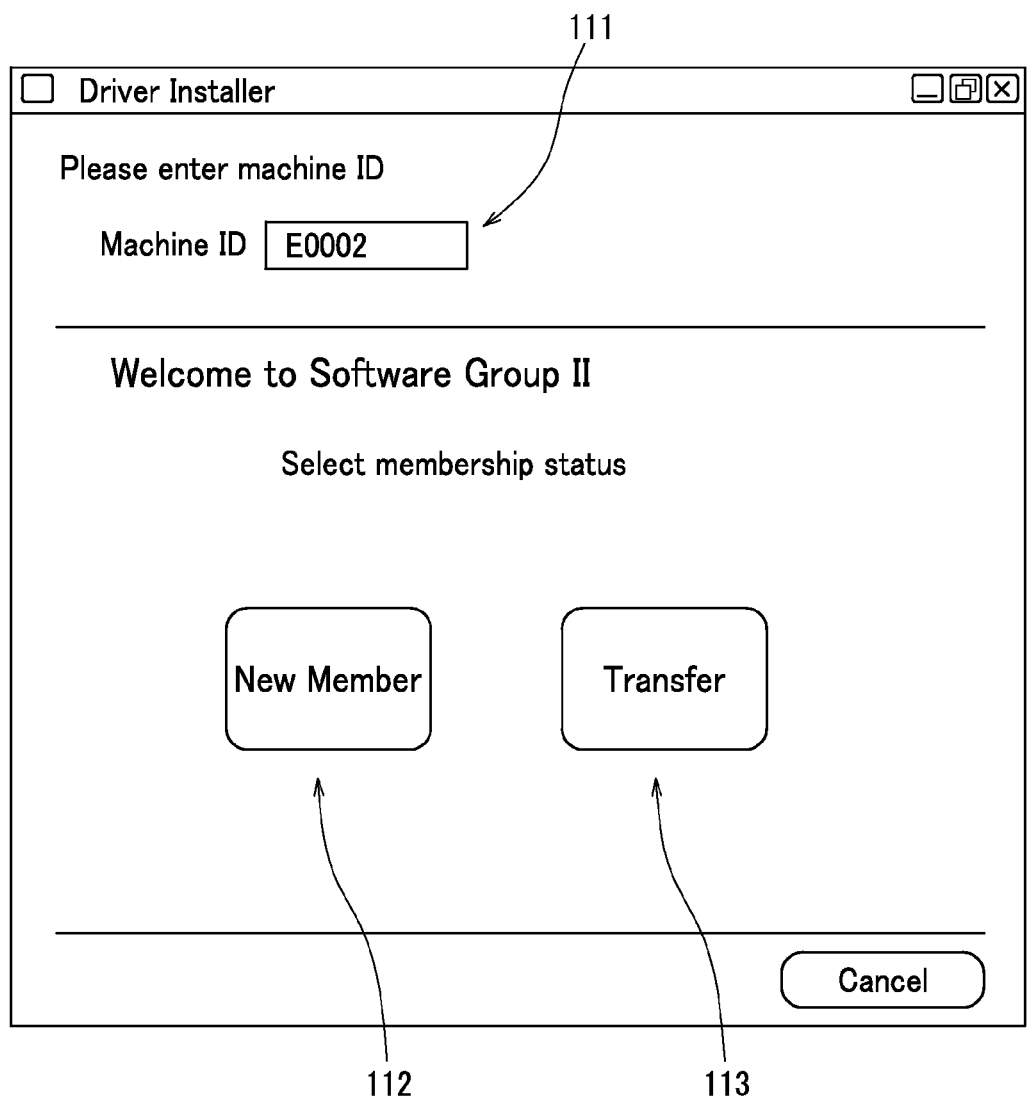
FIG. 6 shows one example of an operation screen displayed for installation of a driver program according to a first embodiment.

FIG. 6 shows one example of an operation screen displayed on the display device 32 of the user terminal device 3 for installation of the driver program 41, according to the first embodiment. In the example shown in FIG. 6, the user inputs into a machine ID field 111 the machine ID of the image forming apparatus 1 supported by the driver program 41 to be installed. The operation screen also displays a New Member key 112 and a Transfer key 113.

The New Member key 112 and the Transfer key 113 are soft keys. The New Member key 112 is the first operation element described above, whereas the Transfer key 113 is the second operation element mentioned above.

When a user operation of selecting the New Member key 112 is made with the input device 33, the installer 53 detects the user operation and creates for the user a document box 13*a* in the image forming apparatus 1 having the machine ID input to the machine ID field 111. More specifically, by using the communication device 31 and the communication processing section 51, the installer 53 transmits a request to create a document box 13*a* to the image forming apparatus 1 having the machine ID. In response, the image forming apparatus 1 having the machine ID creates the document box 13*a* for the user. Subsequently, the installer 53 adds membership information of the user to the group management data 73 managed by the management server 4. More specifically, by using the communication device 31 and the communication processing section 51, the installer 53 transmits the membership information of the user along with a registration request to the management server 4. In response, the management server 4 adds the membership information of the user to the group management data 73.

The membership information of a user includes the identification information of the user, the membership status, the machine ID, and document box creation information. The membership information indicates details of the membership of the user. The machine ID is the ID of the image forming apparatus 1 assigned to the target group. The document box creation information indicates whether or not a document box 13*a* for the user is successfully created. For example, when the image forming apparatus 1 assigned to the target group has a document box function, the document box creation information indicates that the document box 13*a* has been successfully created. On the other hand, when the image forming apparatus 1 assigned to the target group does not have a document box function, the document box 13*a* fails to be created. Thus, the document box creation information indicates that the document box 13*a* has not been created.

On receipt of the membership information of a user, the service processing section 82 of the management server 4 updates the group management data 73 with respect to the group name and the membership status relevant to the user. In addition, the machine ID history relevant to the user is updated by adding the machine ID included in the received membership information, the document box information relevant to the user is updated to be consistent with the document box creation information included in the received membership information, and the log-in history relevant to the user is updated by adding a default value indicating "No", which means no log-in has been made to the corresponding image forming apparatus 1.

When a user operation of selecting the Transfer key 113 is received, the installer 53 performs the following (a) to (c).

(a) The installer 53 creates a document box 13*a* for the user in the image forming apparatus 1 having the machine ID input to the machine ID field 111, in a manner similar to the document box creation performed in response to selection of the New Member key 112.

(b) The installer 53 identifies, with reference to the group management data 73 stored in the management server 4, an image forming apparatus 1 assigned to the group to which the user formerly belonged prior to the target group.

(c) The installer 53 deletes the document box 13*a* from the image forming apparatus 1 thus identified. More specifically, by using the communication device 31 and the communication processing section 51, the installer 53 transmits a deletion request for the document box 13*a* along with the identification information of the user to the identified image forming apparatus 1. In response, the image forming apparatus 1 deletes the document box 13*a* created for the user.

Then, in a manner similar to the membership information registration performed in response to selection of the New Member key 112, the installer 53 adds the membership information of the user to the group management data 73 managed by the management server 4. More specifically, the installer 53 transmits the membership information of the user along with a registration request to the management server 4. In response, the management server 4 adds the membership information of the user to the group management data 73.

According to the first embodiment, the group management data 73 includes document box information indicating, for each user, whether or not the image forming apparatus 1 assigned to the group to which the user belongs has a document box 13a created for the user. The document box information is updated according to the document box creation information included in the membership information. Therefore, the installer 53 performs the following (a) and (b).

(a) The installer 53 determines, with reference to the document box information, whether or not the image forming apparatus 1 identified as a destination of the deletion request has a document box 13a created for the user.

(b) The installer 53 transmits the deletion request to the identified image forming apparatus 1 on determining the presence of a document box 13a created for the user and does not transmit the deletion request on determining the absence of a document box 13a created for the user.

According to the first embodiment, the management server 4 may store default document box settings determined for the respective groups. In this case, the installer 53 may cause the image forming apparatus 1 assigned to the target group to acquire the document box settings determined for the target group and applies the document box settings to a document box 13a newly created for the user.

Figure 7:
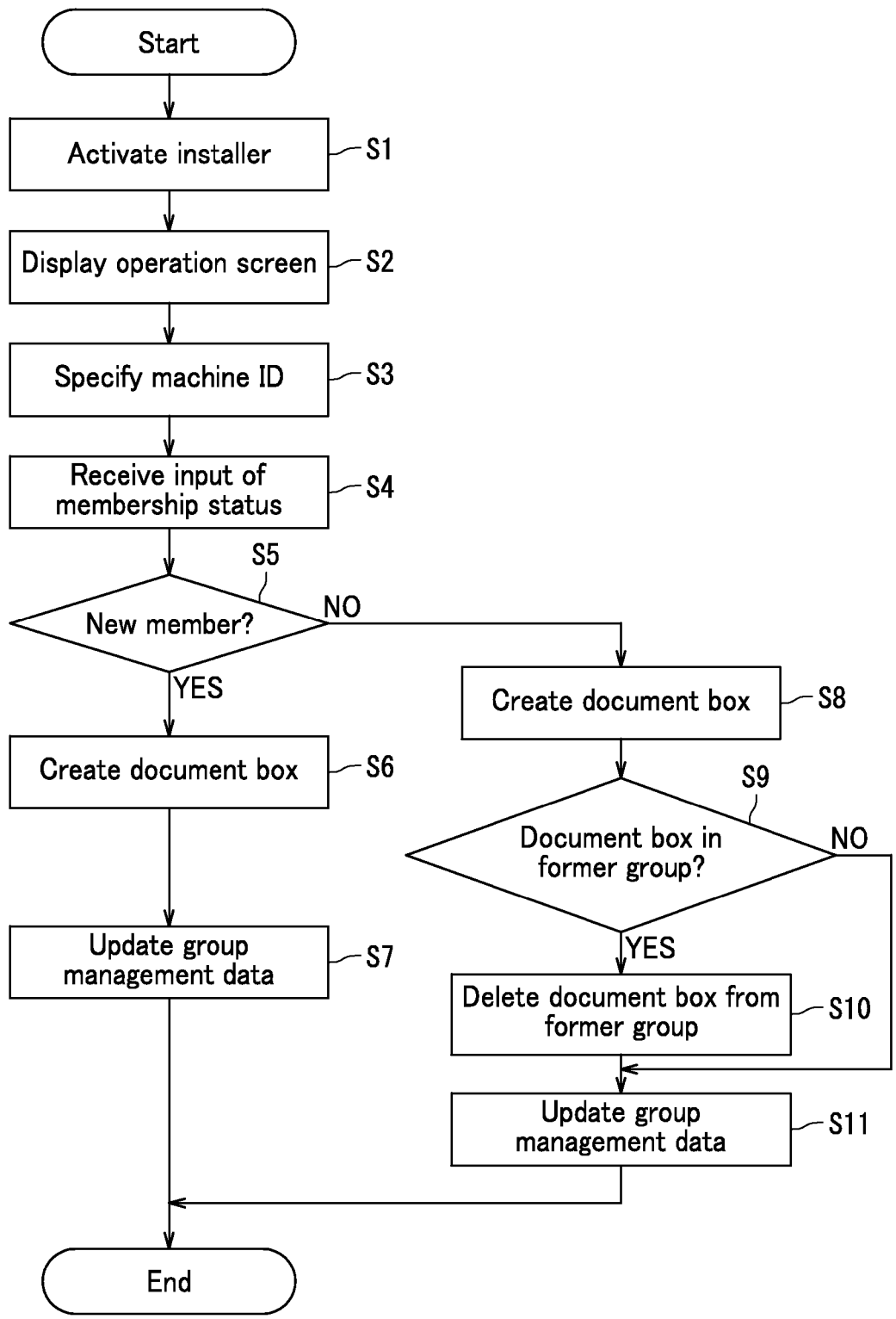
FIG. 7 is a flowchart showing operations of a user terminal device according to the first embodiment.

The following describes operation of a user terminal device 3 according to the first embodiment. FIG. 7 is a flowchart of operation of a user terminal device 3 according to the first embodiment.

According to first embodiment, the user logs in, under his or her own user account, to a user terminal device 3 assigned to a group to which the user joins and executes the installer program 42 on the user terminal device 3 to install, under the user account of the user, the driver program 41 supporting the image forming apparatus 1 assigned to the group. More specifically, the installer 53 is activated in response to a user operation on the user terminal device 3 onto which the user intends to install the driver program 41 (step S1). Once activated, the installer 53 displays an operation screen as shown in FIG. 6 on the display device 32 (step S2).

In response to a user operation of inputting on the operation screen the machine ID of the image forming apparatus 1 to be controlled by the driver program 41, the installer 53 specifies the machine ID according to the user operation (step S3). The installer 53 then installs the driver program 41 that supports the image forming apparatus 1 having the specified machine ID.

The user also selects, with a push, either the New Member key 112 or the Transfer key 113 on the operation screen according to the membership status of the user. In the case where the user has not previously belonged to any of the groups #1 to #n and joins the group #i as the first group ever, the user selects the New Member key 112. In the case where the user has belonged to one or more of the groups #1 to #n and joins the group #i as the second or later group, the user selects the Transfer key 113.

On receipt of the user operation made with the input device 33 (step S4), the installer 53 determines whether the user joints the group as a new member or as a result of transfer (step S5).

When the New Member key 112 is selected, the installer 53 determines that the user joins the group as a new member and therefore transmits, using the communication processing section 51 and the communication device 31, a creation request to the image forming apparatus 1 having the specified machine ID, without referencing to the group management data 73. This causes the image forming apparatus 1 to create a document box 13a for the user (step S6). More specifically, the creation request includes the user ID of the user, and the document box management section 23 of the image forming apparatus 1 having received the creation request creates a document box 13a for the user having the user ID included in the received creation request. More specifically, in addition, by using a predetermined communication protocol, the communication processing section 51 searches the image forming apparatuses 1 on the network 2 with the machine ID as a search key. The communication processing section 51 detects the image forming apparatus 1 having the machine ID and transmits the creation request to the image forming apparatus 1 thus detected.

After creation of the document box 13a, the installer 53 creates membership information as described above and transmits the membership information and a registration request to the management server 4 by using the communication processing section 51 and the communication device 31. This causes the management server 4 to update the group management data 73 based on the membership information received (step S7). Upon receipt of the registration request and the membership information, the service processing section 82 of the management server 4 updates the group management data 73 in a manner described above.

When the user joins the group as a new member, the group management data 73 includes no record relevant to the user. The service processing section 82 therefore adds a record indicating the name of the group that the user joins, the membership status (indicting new member), the user identification data, the specified machine ID, document box information (indicating "Yes" representing the presence of a document box), and the log-in history (indicating "No").

On the other hand, when the Transfer key 113 is selected, the installer 53 determines that that the user joins the group as a result of transfer and therefore transmits, using the communication processing section 51 and the communication device 31, a creation request to the image forming apparatus 1 having the specified machine ID. Similarly to step S6, this causes a document box 13a to be created for the user (step S8).

After creation of the document box 13a, the installer 53 accesses the management server 4 by using the communication processing section 51 and the communication device 31 in order to read a record relevant to the user from the group management data 73, specifies the machine ID of the image forming apparatus 1 assigned to the former group to which the user formerly belonged before the transfer, and determines whether the image forming apparatus 1 assigned to the former group has a document box 13a created for the user (step S9).

On determining that the image forming apparatus 1 assigned to the former group has a document box 13a created for the user, the installer 53 transmits, using the communication processing section 51 and the communication device 31, a deletion request for the document box 13a to the image forming apparatus 1 having the specified machine ID. This causes the document box 13a to be deleted (step S10). More specifically, the deletion request includes the user ID of the user, and the document box management section 23 of the image forming apparatus 1 having received the deletion request deletes the document box 13a created for the user having the user ID included in the received deletion request. More specifically, in addition, by using a predetermined communication protocol, the communication processing section 51 searches the image forming apparatuses 1 on the network 2 with the machine ID as a search key. The communication processing section 51 detects the image forming apparatus 1 having the machine ID and transmits the deletion request to the image forming apparatus 1 thus detected.

When the image forming apparatus 1 assigned to the former group does not have a document box 13a created for the user, the installer 53 does not transmit a deletion request.

Subsequently, the installer 53 creates the membership information as described above and transmits the membership information and a registration request to the management server 4 by using the communication processing section 51 and the communication device 31. This causes the management server 4 to update the group management data 73 based on the membership information received (step S11). Upon receipt of the registration request and the membership information, the service processing section 82 of the management server 4 updates the group management data 73 in a manner described above.

When the user joins the group as a result of transfer, the group management data 73 already includes a record relevant to the user. Therefore, as in for example the record relevant to the user ID "ABC" shown in FIG. 5, the record relevant to the user is updated such that the group name (and membership status when necessary) is changed to the group name of the group that the user newly joins, the machine ID specified as the machine ID of the image forming apparatus 1 assigned to the new group is added to the machine ID history, document box information (indicating "Yes") is added, and the log-in history (indicating "No") is added.

As has been described above, the installer program 42 stored on a recording medium is executed by the arithmetic processing device 35 of a user terminal device 3 when the user of the user terminal device 3 joins a target group to which an image forming apparatus 1 supported by the driver program 41 is assigned. When executed, the arithmetic processing device 35 performs the following (a) to (c).

(a) The arithmetic processing device 35 displays an operation screen including a first operation element and a second operation element on the display device 32. The a first operation element is to be selected when the user joins the target group without having previously belonged to any other groups. The second operation element is to be selected when the user joins the target group as a result of transfer from a former group to which the user formerly belonged.

(b) In response to a user operation of selecting the first operation element, the arithmetic processing device 35 controls the image forming apparatus 1 to create a document box 13a for the user and adds the membership information of the user to the group management data 73 managed by the management server 4.

(c) In response to a user operation of selecting the second operation element, the arithmetic processing device 35 controls the image forming apparatus 1 to create a document box 13a for the user, identifies the image forming apparatus 1 assigned to the former group with reference to the group management data 73, causes the thus identified image forming apparatus 1 to delete the document box 13a having been created for the user, and adds the membership information of the user to the group management data 73.

The membership information includes the identification information of the user and the identification information of the image forming apparatus 1 assigned to the target group. The group management data 73 includes, for each of a plurality of users, history data including identification information of image forming apparatuses assigned to groups to which the corresponding user has belonged, the history data being based on membership information having been added to the group management data 73 for the corresponding user.

Consequently, the group management data 73 is automatically updated when a user carries out procedures for joining a group (installation of the driver program 41 and a user operation on the operation screen according to the first embodiment). This reduces the workload imposed on an administrator involved in the user joining the group.

Second Embodiment

In the second embodiment, each image forming apparatus 1 is an image forming apparatus according the present disclosure. When a user logs in to an image forming apparatus 1 for the first time, the image forming apparatus 1 displays an operation screen as described above on the operation panel 12. In response to a user operation of selecting the first or second operation element, the image forming apparatus 1 transmits the membership information described above to the management server 4.

According to the second embodiment, the installer 53 neither displays an operation screen nor transmits the membership information described above.

According to the second embodiment, in the system shown in FIGS. 1 to 4, when a user joining a target group logs in to an image forming apparatus 1 assigned to the target group, the log-in processing section 21 included in the image forming apparatus 1 performs the following (a), (b1), and (b2).

(a) When the user has no log-in history indicating a previous log-in to the image forming apparatus 1, the log-in processing section 21 displays an operation screen including a first operation element and a second operation element on the display device 12a. The first operation element is to be selected when the user joins the target group without having previously belonged to any other groups. The second operation element is to be selected when the user joins the target group as a result of transfer from another group to which the user formerly belonged.

(b1) In response to a user operation of selecting the first operation element, the log-in processing section 21 controls the document box management section 23 to create a document box 13a for the user and adds the membership information of the user to the group management data 73 managed by the management server 4.

(b2) In response to the user operation of selecting the second operation element, the log-in processing section 21 controls the document box management section 23 to create a document box 13a for the user, identifies an image forming apparatus 1 assigned to the former group to which the user formerly belonged before the transfer to the target group with reference to the group management data 73, and controls the identified image forming apparatus 1 to delete the document box 13a created for the user, and adds the membership information of the user to the group management data 73.

The membership information includes the identification information of the user and the identification information (such as the machine ID) of the image forming apparatus 1 assigned to the target group. The group management data 73 is as described in first embodiment.

The log-in history may be a log-in log kept by each image forming apparatus 1 or the log-in history included in the group management data 73 shown in FIG. 5. When the log-in history included in the group management data 73 is used, the log-in processing section 21 accesses the management server 4 by using the communication device 14 to search the group management data 73 for a record relevant to the user. On finding a record with the value indicating "Yes" with respect to the image forming apparatus 1, the log-in processing section 21 determines that the user has previously logged in to the image forming apparatus 1. On the other hand, when not finding such a record in the long-in history included in the group management data 73, the log-in processing section 21 determines that the user has not previously logged in to the image forming apparatus 1.

Figure 8:
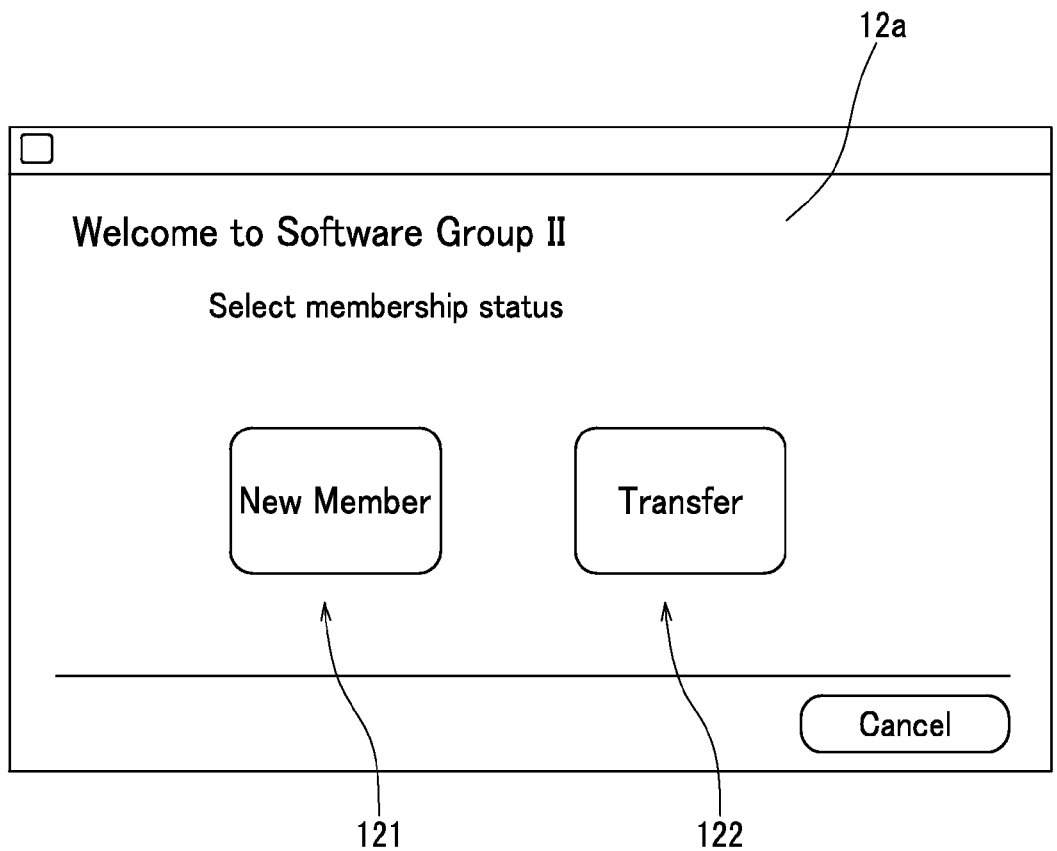
FIG. 8 shows an example of an operation screen displayed upon first log-in to an image forming apparatus according to a second embodiment.

FIG. 8 shows an example of an operation screen displayed on the display device 12a upon the first log-in to the image forming apparatus 1 according to a second embodiment. In the example shown in FIG. 8, a New Member key 121 and a Transfer key 122 are presented on the operation screen. The New Member key 121 and the Transfer key 122 are soft keys. The New Member key 121 is the first operation element described above, whereas the Transfer key 122 is the second operation element described above.

In response to a user operation of selecting the New Member key 121, the log-in processing section 21 detects the operation with the input device 12b and controls the document box management section 23 to create in the image forming apparatus 1 a document box 13a for the user. Subsequently, the log-in processing section 21 adds membership information of the user to the group management data 73 managed by the management server 4. More specifically, the log-in processing section 21 transmits the membership information of the user and a registration request to the management server 4 by using the communication device 14. In response, the management server 4 adds the membership information of the user to the group management data 73.

The membership information includes identification information of the user, membership information indicating the membership status of the user, the machine ID of the image forming apparatus 1 assigned to the target group, and document box creation information indicating whether or not the document box 13a is successfully created for the user. For example, when the image forming apparatus 1 assigned to the target group has a document box function, the document box creation information indicates that the document box 13a has been successfully created. On the other hand, when the image forming apparatus 1 assigned to the target group does not have a document box function, the document box 13a fails to be created. Thus, the document box creation information indicates that the document box 13a has not been created.

On receipt of the membership information of the user, the service processing section 82 of the management server 4 updates the group management data 73 with respect to the group name and the membership status of the user. In addition, the machine ID history is updated by adding the machine ID included in the received membership information, the document box information is updated to be consistent with the document box creation information included in the received membership information, and the log-in history is updated by adding a default value indicating "Yes".

When a user operation of selecting the Transfer key 122 is received, the log-in processing section 21 performs the following (a) to (c).

(a) In a manner similar to the document box creation performed in response to selection of the New Member key 112, the log-in processing section 21 controls the document box management section 23 to create a document box 13a for the user.

(b) The log-in processing section 21 identifies an image forming apparatus 1 assigned to the former group to which the user formerly belonged before the transfer, with reference to the group management data 73 managed by the server 4.

(c) The log-in processing section 21 deletes the document box 13a created for the user from the identified image forming apparatus 1.

More specifically, by using the communication device 14, the log-in processing section 21 transmits a deletion request for the document box 13a along with the identification information of the user to the identified image forming apparatus 1. In response, the identified image forming apparatus 1 deletes the document box 13a created for the user.

Then, in a manner similar to the membership information registration performed in response to selection of the New Member key 121, the log-in processing section 21 adds the membership information of the user to the group management data 73 managed by the management server 4.

According to the second embodiment, the document box management section 23 may determine whether or not the image forming apparatus 1 identified as being assigned to the former group to which the user belonged before the transfer has a document box 13a created for the user, based on the document box information. On determining that the identified image forming apparatus 1 has a document box 13a created for the user, the document box management section 23 may transmit a deletion request for deletion of the document box 13a to the identified image forming apparatus 1. On the other hand, on determining that the identified image forming apparatus 1 does not have a document box 13a created for the user, the document box management section 23 may not be required to transmit a deletion request for deletion of the document box 13a to the identified image forming apparatus 1.

According to the second embodiment, the management server 4 may store default document box settings determined for the respective groups, and the document box management section 23 may acquire the document box setting determined for the target group from the management server 4 and apply the document box setting to the created document box 13a.

Other components of the devices according to the second embodiment are not described as they are identical to the corresponding components already described above in first embodiment.

Figure 9:
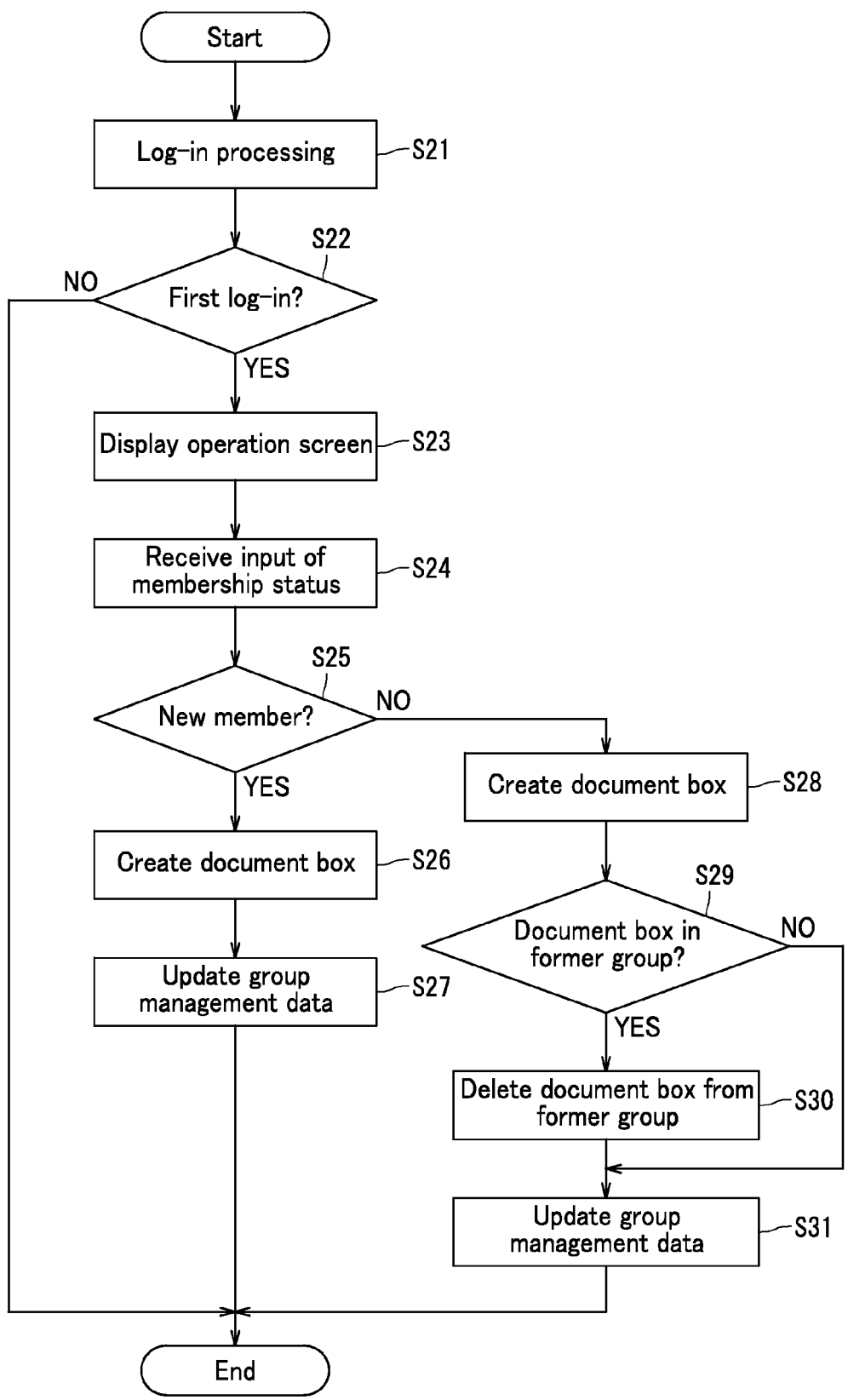
FIG. 9 is a flowchart showing operations of the image forming apparatus according to the second embodiment.

The following describes operation of an image forming apparatus 1 according to the second embodiment. FIG. 9 is a flowchart showing operations of the image forming apparatus 1 according to the second embodiment.

According to the second embodiment, a user is required to log-in to an image forming apparatus 1 assigned to a group to which the user belongs, before the user uses the image forming apparatus 1.

When the user inputs identification information (for example, user ID) by operating the input device 12b for log-in, the log-in processing section 21 performs authentication of the user based on the information input and determines whether or not to permit the log-in (step S21).

Upon successfully authenticating the user and permits the log-in, the log-in processing section 21 determines whether or not the log-in is the first log-in by the user to the image forming apparatus 1 (step S22). When the user authentication fails, no steps subsequent to step S22 are performed.

On determining that the log-is the first log-in, the log-in processing section 21 displays an operation screen as shown in FIG. 8 on the display device 12a (step S23).

The user operates with a push either the New Member key 121 or the Transfer key 122 on the operation screen according to the membership status of the user. In the case where the user has not previously belonged to any of the groups #1 to #n and the group #i is the first group that the user has ever joined, the user selects the New Member key 121. In the case where the user has belonged to one or more of the groups #1 to #n and the group #i is the second or later group that the user has ever joined, the user pushes the Transfer key 122.

On receipt of the user operation by the input device 12b (step S24), the log-in processing section 21 determines whether the user joints the group as a new member or as a result of transfer (step S25).

When the New Member key 121 is selected, the log-in processing section 21 determines that the user joins the group as a new member and therefore controls the document box management section 23 to create, in the image forming apparatus 1, a document box 13a for the user, without referencing to the group management data 73 (step S26).

After creation of the document box 13a, the log-in processing section 21 creates membership information as described above and transmits the membership information and a registration request to the management server 4 by using the communication device 14. This causes the management server 4 to update the group management data 73 based on the membership information received (step S27). Upon the management server 4 receiving the registration request and the membership information, the service processing section 82 updates the group management data 73 in a manner described above.

When the user joins the group as a new member, the group management data 73 includes no record relevant to the user. The service processing section 82 therefore adds a record indicating the name of the group that the user joins, the membership status (indicting new member), the user identification data, the specified machine ID, document box information (indicating "Yes"), and the log-in history (indicating "No").

On the other hand, when the Transfer key 122 is selected, the log-in processing section 21 determines that the user joins the group as a result of transfer and therefore creates a document box 13a in a manner similar to step S26 (step S28).

After creation of the document box 13a, the log-in processing section 21 accesses the management server 4 using the communication device 14 in order to read a record relevant to the user from the group management data 73, specifies the machine ID of an image forming apparatus 1 assigned to the former group to which the user formerly belonged before the transfer, and determines whether or not the image forming apparatus 1 assigned to the former group has a document box 13a created for the user (step S29).

On determining that the image forming apparatus 1 assigned to the former group has a document box 13a created for the user, the log-in processing section 21 transmits, using the communication device 14, a deletion request for the document box 13a to the image forming apparatus 1 having the specified machine ID. This causes the document box 13a to be deleted (step S30). More specifically, the deletion request includes the user ID of the user, and the document box management section 23 of the image forming apparatus 1 having received the deletion request deletes the document box 13a created for the user having the user ID. More specifically, in addition, by using a predetermined communication protocol, the communication processing section 51 searches the image forming apparatuses 1 on the network 2 with the machine ID as a search key. The communication processing section 51 detects an image forming apparatus 1 having the machine ID and transmits the deletion request to the image forming apparatus 1 thus detected.

When the image forming apparatus 1 assigned to the former group does not have a document box 13a created for the user, the log-in processing section 21 does not transmit a deletion request.

Thereafter, the log-in processing section 21 creates membership information as described above and transmits the membership information and a registration request to the management server 4 by using the communication device 14. This causes the management server 4 to update the group management data 73 based on the membership information received (step S31). Upon receipt of the registration request and the membership information, the service processing section 82 of the management server 4 updates the group management data 73 in a manner described above.

According to the second embodiment having been described above, when a user joining a target group logs in to an image forming apparatus 1 assigned to the target group, the log-in processing section 21 included in the image forming apparatus 1 performs the following (a), (b1), and (b2).

(a) The log-in processing section 21 displays an operation screen including a first operation element and a second operation element on the display device 12a. The first operation element is to be selected when the user joins the target group without having previously belonged to any other groups. The second operation element is to be selected when the user joins the target group as a result of transfer from a former group to which the user formerly belonged.

(b1) In response to a user operation of selecting the first operation element, the log-in processing section 21 controls the document box management section 23 to create a document box 13a for the user and adds the membership information to the group management data 73 managed by the management server 4.

(b2) In response to the user operation of selecting the second operation element, the log-in processing section 21 controls the document box management section 23 to create a document box 13a for the user, identifies an image forming apparatus 1 assigned to the former group to which the user belonged before the transfer to the target group with reference to the group management data 73, controls the identified image forming apparatus 1 to delete the document box 13a created for the user, and adds the membership information of the user to the group management data 73.

The membership information includes the identification information of the user and the identification information of the image forming apparatus 1 assigned to the target group. The group management data 73 includes, for each user, history data including identification information of image forming apparatuses 1 having been assigned to group that the user has joined.

Consequently, the group management data 73 is automatically updated when a user carries out procedures (log-in to the image forming apparatus 1 and a user operation on the operation screen according to the second embodiment) when joining a group. This reduces the workload imposed on an administrator involved in the user joining the group.

Third Embodiment

According to the first embodiment described above, the processing steps caused by the installer program 42 upon installation of the driver program 41 includes display of the operation screen, addition of the membership information of a user, and operation relevant to document box 13a. According to the third embodiment, however, the same processing steps as those caused by the installer program 42 are caused by the driver program 41 supporting an image forming apparatus 1 assigned to a target group to which a user joins when the driver program 41 is activated for the first time after installation of the driver program 41. Each time the driver program 41 is activated on a user terminal device 3 by a user, an activation history indicating the activation is stored for example on the user terminal device 3. When the activation history includes no record indicting a previous activation, it is determined that the driver program 41 is activated for the first time. When the driver program 41 is activated for the second or later time, the processing steps are not performed. Other components of the devices according to the third embodiment are not described as they are identical to the corresponding components described in first embodiment.

Although the embodiments described above are preferred examples of the present disclosure. However, the present disclosure is in no way limited to the specific embodiments described, and various alterations and modifications are possible within the scope of the essence of the present disclosure.

For example, the first and second embodiments described above may be altered such that before deletion of a document box 13a from the image forming apparatus 1 assigned to the former group, any document data stored in the document box 13a is moved to the image forming apparatus 1 assigned to the new group.

What is claimed is:

1. A non-transitory computer-readable recording medium storing an installer program that is for execution by a computer in a terminal device to install a driver program on the terminal device when a user of the terminal device joins a target group to which an image forming apparatus of a specific model supported by the driver program is assigned, the installer program causing the computer to:

display an operation screen on a display device of the terminal device, the operation screen including a first operation element to be selected when the user joins the target group without having previously belonged to any other groups and a second operation element to be selected when the user joins the target group as a result of transfer from a former group to which the user formerly belonged;

in response to selection of the first operation element by the user,
control the image forming apparatus to create therein a document box for the user and
add membership information of the user to group management data managed by a predetermined server; and in response to selection of the second operation element by the user,
control the image forming apparatus to create therein a document box for the user,
identify an image forming apparatus assigned to the former group with reference to the group management data,
control the identified image forming apparatus to delete a document box created therein for the user, and
add membership information of the user to the group management data, wherein the membership information includes identification information of the user and identification information of the image forming apparatus assigned to the target group, the group management data includes, for each of a plurality of users, history data including identification information of image forming apparatuses assigned to groups to which the corresponding user has belonged, the history data being based on membership information having been added to the group management information for the corresponding user, the membership information includes document box creation information indicating whether or not a document box is successfully created for the user, the group management data includes, for each of the plurality of users, document box information indicating whether or not image forming apparatuses assigned to groups to which the corresponding user has belonged have a document box created for the corresponding user, and the installation program further causes the computer to:
update the document box information based on the membership information;
determine, based on the document box information, whether or not the identified image forming apparatus has a document box created for the user;
on determining that the identified image forming apparatus has a document box created for the user, transmit an instruction to delete the document box to the identified image forming apparatus; and
on determining that the identified image forming apparatus does not have a document box created for the user, not transmit an instruction to delete the document box to the identified image forming apparatus.

2. The non-transitory computer-readable recording medium according to claim 1, wherein
the installer program further causes the computer to, if any document data remains in the document box to be deleted, move the remaining document data to the document box created in the image forming apparatus assigned to the target group.

3. The non-transitory computer-readable recording medium according to claim 1, wherein the installation program further causes the computer to:
control the image forming apparatus having created the document box to acquire a document box setting determined for the target group from the server; and
apply the document box setting to the created document box.

* * * * *